US012600046B2

(12) United States Patent
Demko

(10) Patent No.: US 12,600,046 B2
(45) Date of Patent: Apr. 14, 2026

(54) AUTO OPENING FOLDING KNIFE BLADE ENGAGEMENT LOCK

(71) Applicant: Andrew Demko, Wampum, PA (US)

(72) Inventor: Andrew Demko, Wampum, PA (US)

( * ) Notice: Subject to any disclaimer, the term of this patent is extended or adjusted under 35 U.S.C. 154(b) by 108 days.

(21) Appl. No.: 18/623,352

(22) Filed: Apr. 1, 2024

(65) Prior Publication Data

US 2025/0303592 A1 Oct. 2, 2025

(51) Int. Cl.
*B26B 1/04* (2006.01)

(52) U.S. Cl.
CPC .................................... *B26B 1/048* (2013.01)

(58) Field of Classification Search
CPC ..... B26B 1/02; B26B 1/04; B26B 1/042–046; B26B 1/048
See application file for complete search history.

(56) References Cited

U.S. PATENT DOCUMENTS

| | | | | |
|---|---|---|---|---|
| 4,837,932 | A | 6/1989 | Elsener | |
| 6,574,869 | B1 | 6/2003 | McHenry et al. | |
| 6,591,504 | B2 | 7/2003 | Onion | |
| 7,562,454 | B2 | 7/2009 | Steigerwalt et al. | |
| 9,527,218 | B2 | 12/2016 | Valdez | |
| 10,632,632 | B1 * | 4/2020 | Demko | B26B 1/048 |
| 11,220,013 | B1 | 1/2022 | Valerio, II | |
| 11,673,280 | B1 * | 6/2023 | Randall | B26B 1/04 30/161 |
| 2010/0192381 | A1 * | 8/2010 | Sakai | B26B 1/048 30/160 |
| 2016/0279810 | A1 * | 9/2016 | Demko | B26B 1/042 |
| 2016/0354936 | A1 * | 12/2016 | Busse | B26B 1/048 |
| 2018/0133907 | A1 * | 5/2018 | Kao | B26B 1/02 |
| 2019/0184584 | A1 * | 6/2019 | Duey | B25F 1/04 |
| 2019/0344458 | A1 * | 11/2019 | Cheng | B26B 1/044 |
| 2019/0381678 | A1 * | 12/2019 | Busse | B26B 1/048 |
| 2020/0338766 | A1 * | 10/2020 | Huang | B26B 5/00 |
| 2020/0391395 | A1 * | 12/2020 | Nicaise | B26B 1/04 |
| 2022/0410415 | A1 * | 12/2022 | Douglas | B26B 1/048 |
| 2024/0033952 | A1 * | 2/2024 | Duey | B26B 1/048 |

* cited by examiner

*Primary Examiner* — Ghassem Alie
*Assistant Examiner* — Richard D Crosby, Jr.
(74) *Attorney, Agent, or Firm* — Harpman & Harpman

(57) ABSTRACT

An auto opening folding knife having a blade pivoted from a closed position to a spring urged release open locked position with a combined self-activating sliding auto release and locking arm. The sliding auto release and locking arm is mounted within the knife handle on dual fixed guide and pivot pins within respective arm openings being spring urged there against. Arm positional projections are engaged on a modified blade shank during operation moving the locking arm back and up then releasing to slide forward locking the blade in auto open use position until manual arm engagement by the user against the arm spring and blade spring for release and transitional closure.

4 Claims, 4 Drawing Sheets

AUTO OPENING FOLDING KNIFE BLADE ENGAGEMENT LOCK

BACKGROUND OF THE INVENTION

1. Technical Field

This invention relates to folding pocket type knives that have locking mechanisms to hold the knife blade in open locked use position or in folded closed non-use position. Such locking mechanisms are referred to as locking bars or pin configurations.

2. Description of Prior Art

Prior art folding knives have been developed with a variety of blade locking engagement structures to afford numerous blade lock and release positions, see for example U.S. Pat. Nos. 4,837,932, 6,574,869 and 6,591,504, 10,632,632 and 11,220,013. Auto opening locking engagement examples can be seen in U.S. Pat. Nos. 9,527,218 and 7,562,454.

In U.S. Pat. No. 4,837,932, a locking blade pocket knife is disclosed having a beam spring with a retractable locking member with a ratchet tooth, cam guide and engaging the tang portion of the knife blade controlling movement.

U.S. Pat. No. 6,547,869 claims a folding pocket knife with a lock having a sliding lock element with a pin projection that engages the blade preventing unlocking from the open position unintentionally.

U.S. Pat. No. 6,591,504 shows a folding knife with a safety lock movably mounted on its handle for a lock to unlock position.

U.S. Pat. No. 9,815,213 claims an ambidextrous actuator locking mechanism for automatic opening or manual opening auto assist.

Applicant's U.S. Pat. No. 10,632,632 discloses a folding knife with a sliding release and locking arm engaging the blade shank in closed and open locked positions.

U.S. Pat. No. 11,220,013 claims a folding knife blade with a spring urged release locking arm to open and close the knife blade.

U.S. Pat. No. 7,526,454 discloses a dual opening assist lock that can be automatic or semi-automatic blade release with the spring arm applied pressure to the blade.

SUMMARY OF THE INVENTION

A folding knife auto opening and locking device having a spring urged self-repositioning safety lock and release arm that is engaged by the blade shank as it opens being repositioned thereby in longitudinal and pivotal travel paths. User arm initiation is required to unlock from open position releasing both the spring urged blade and the spring slidable dual action self-locking arm. Multiple arm to blade shank engagement points define blade auto open lock position and corresponding blade locked retainment in closed position with continuous intermediate positioning.

DETAILED DESCRIPTION OF THE INVENTION

Figure 1:
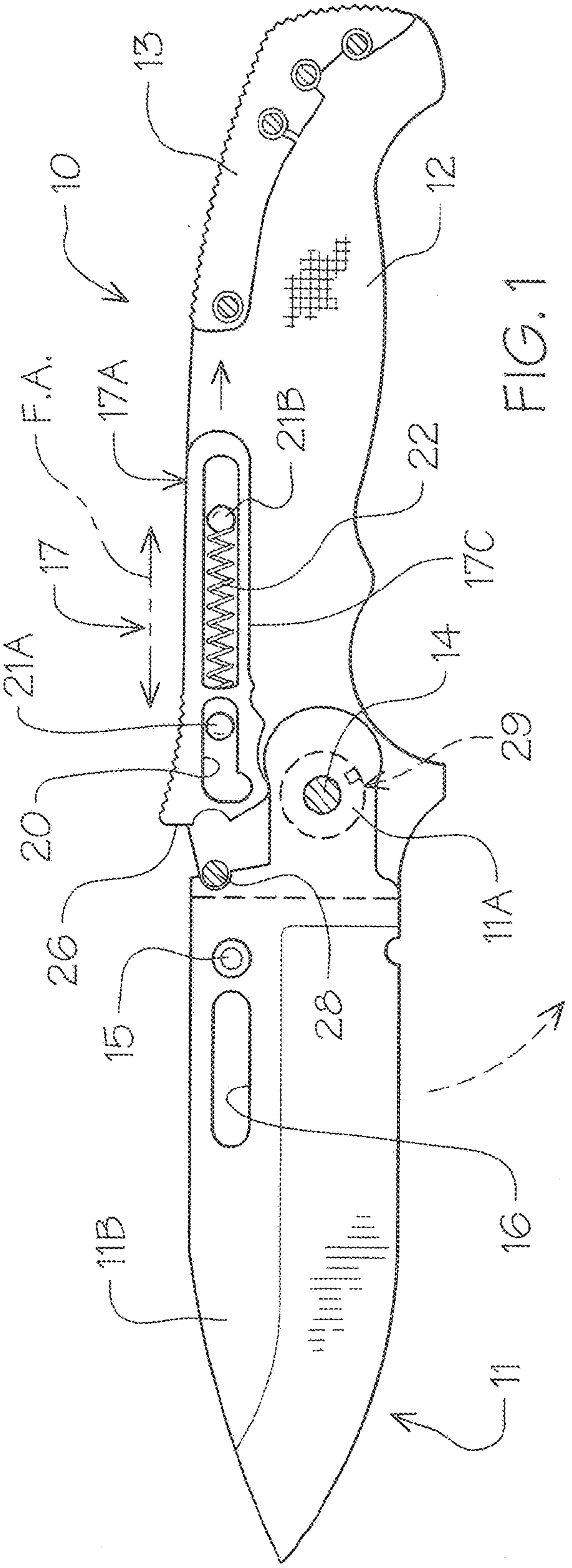
FIG. 1 is a side elevational view of a folding knife of the invention in open locked position with portions broken away.
Figure 2:
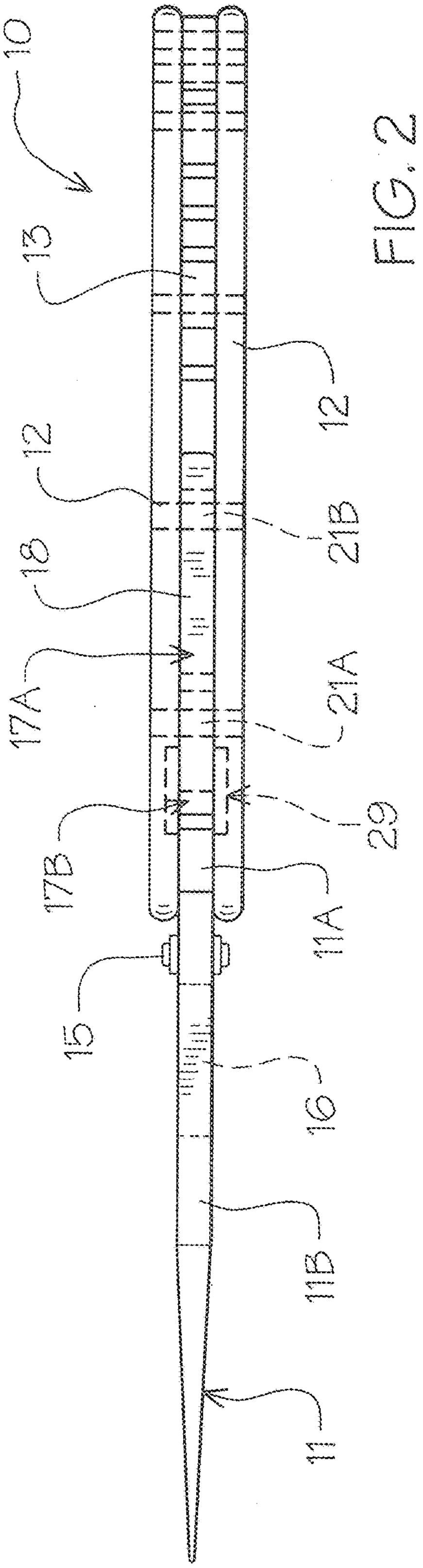
FIG. 2 is a top plan view of the folding knife.
Figure 3:
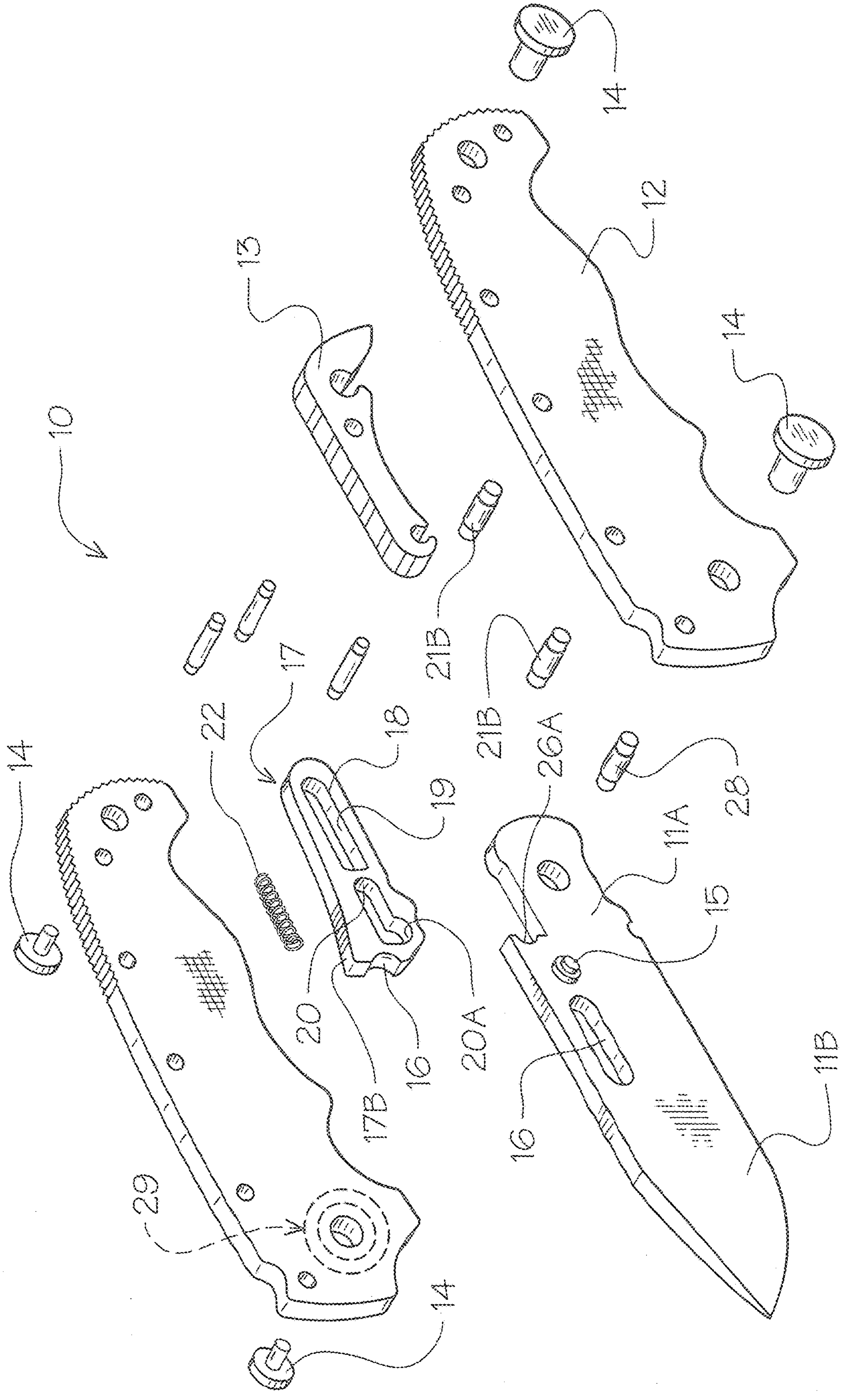
FIG. 3 is an exploded perspective assembly view of the folding knife of the invention in open position.

Referring to FIGS. 1 and 2 of the drawings, an auto opening folding knife 10 of the invention can be seen in its unfolded locked position. The knife 10 has a blade 11 pivotally secured within handle portions 12 with an end handle support spacer 13 secured there between. The blade 11 is pivotally secured between handle portions 12 by a hinge pin fitting 14 therethrough for auto displacement which defines an auto opening folding knife configuration. The blade 11 has a shank 11A with an extending blade body 11B.

An auto opening spring assembly 29 is engaged with the shank 11A and the handle portions providing an automatic blade opening from a closed to a fully open locked position as will be understood by those skilled in the art.

Figure 4:
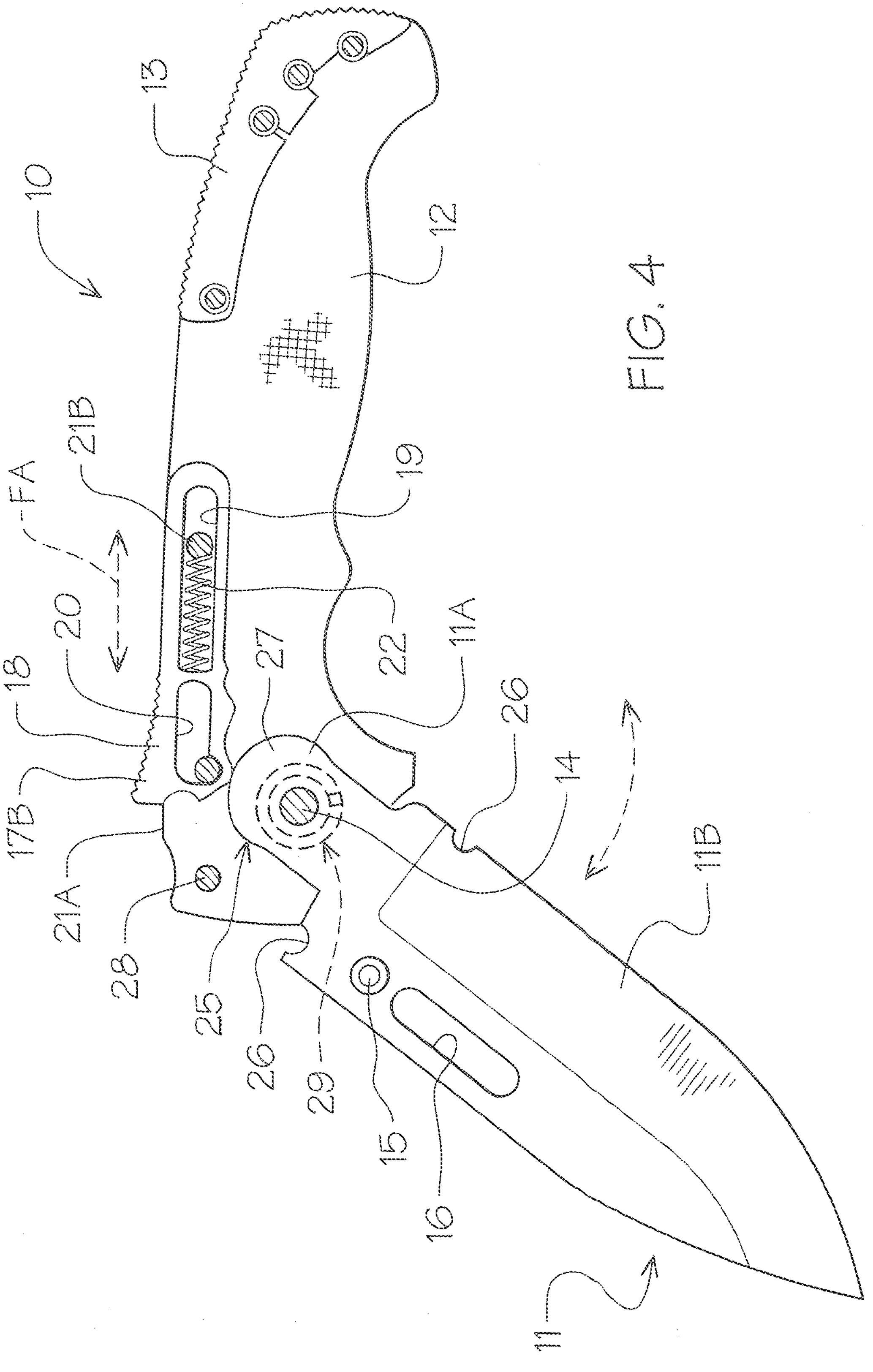
FIG. 4 is a side elevational view with portions broken away of the folding knife with locking arm release in partially opened or closed position.
Figure 5:
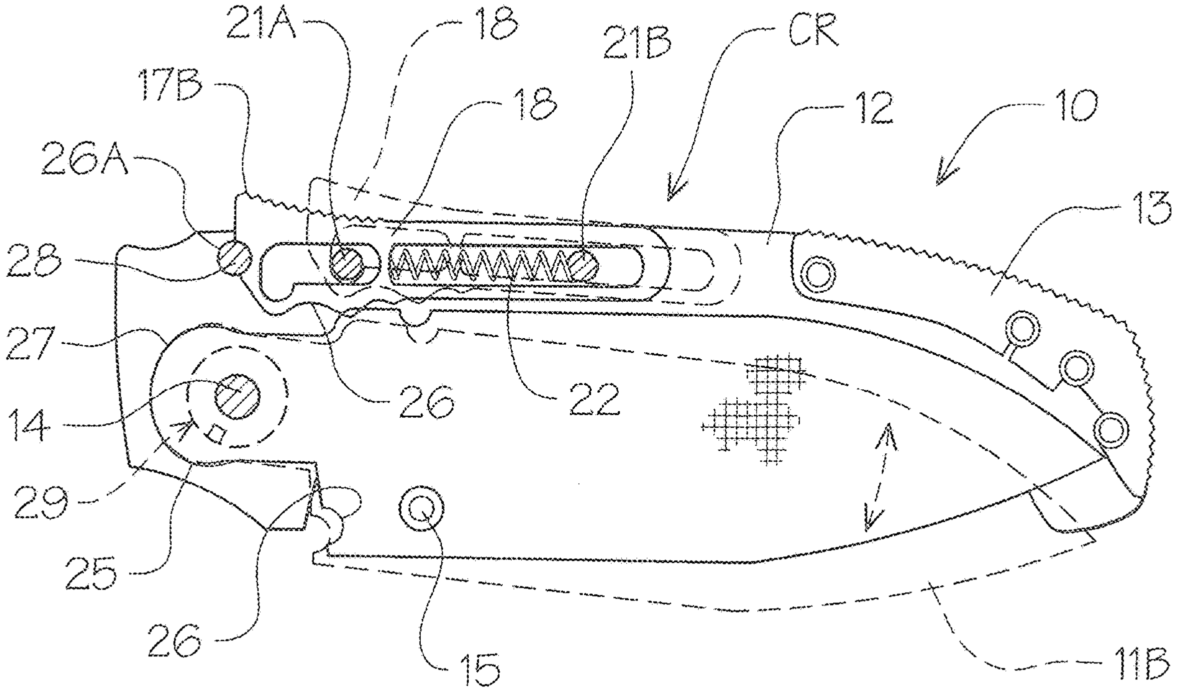
FIG. 5 is an enlarged side elevational view with portions broken away of the folding knife in closed locking arm engaged position.

A safety and auto release locking arm assembly 17 is movably positioned within the handle portions 12 to and from open blade lock position and closed blade retainment position illustrated in FIGS. 1 and 5 of the drawings respectively. Safety release locking arm assembly 17 has an apertured arm 18 with an elongated repositioning retainment slot 19 therein. A second repositioning guide slot 20 is formed adjacent the slot 19 having a foreshortened length with a contoured depending end portion retainment slot at 20A, best seen in FIGS. 1, 3-6 of the drawings.

The safety auto release locking arm assembly 17 is, as noted, movably retained within and between the handle portions 12 by a pair of fixed guide pins 21A and 21B. Guide pin 21A is received within the contoured depending end portion retainment slot 20 while the guide pin 21B extends through the corresponding elongated arm slot 19.

A resilient arm spring 22 is retained within the elongated arm slot 19 against the guide pin 21B thus urging the locking release arm 18 towards the blade shank 11A for selective engagement therewith during the blade range of motion as will be described in detail hereinafter.

The arm's upper surface 17A has an upstanding tapered and textured end portion surfaces 17B over the contoured depending end portion retainment slot 20 which acts as and extends from the handle portions 12 for a user engagement surface during use.

Figure 6:
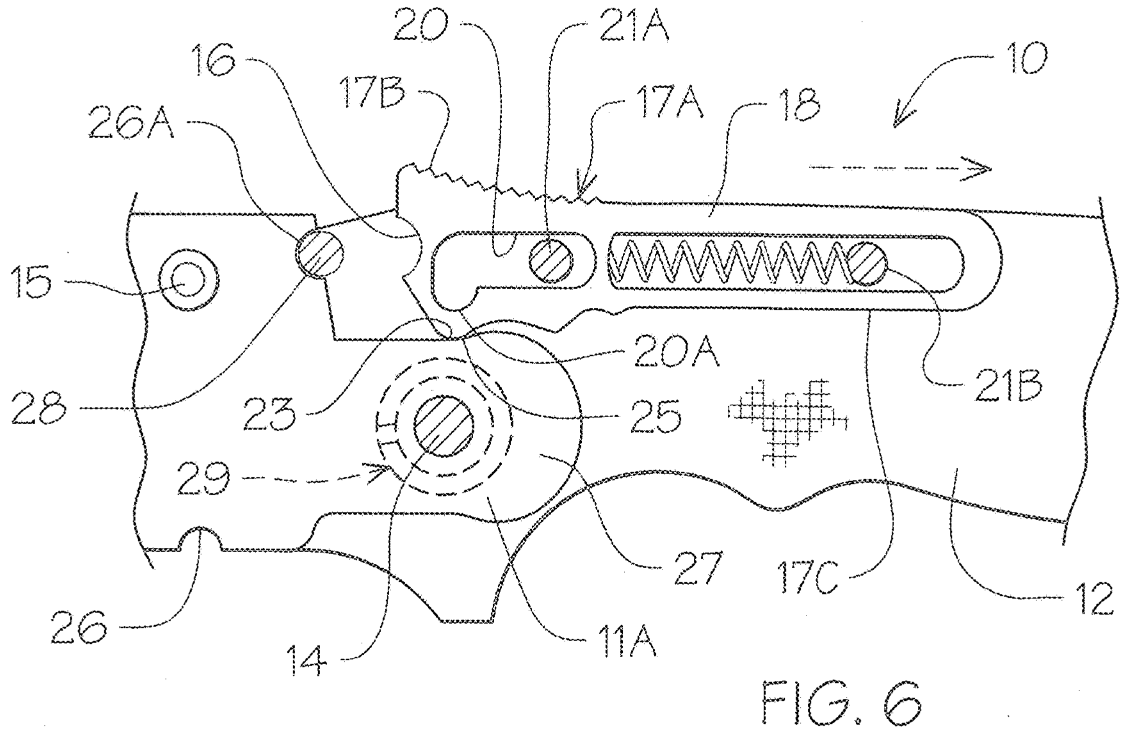
FIG. 6 is an enlarged partial side elevational view of the locking arm engaging in locked open position with portions broken away.

The lower end surface 17C in oppositely disposed relation thereto has tapered blade selective shank engagement portion 23 which defines the depending portion of the arm 18 for direct retainment engagement with a portion 25 of the blade shank 11A in blade open lock position, as best seen in FIG. 6 of the drawings. A tapered end arm surface 26 extends from the lower arm 18 surface engagement portion 23 and correspondingly in direct blade shank engagement when in closed position as seen clearly in FIG. 5 of the drawings, correspondingly, an end arm notch 16 in the end surface of the arm 18 is in direct contact with a stop pin in 28 when in blade closed and locked position.

The stop pin 28 extends from the handles 12 for registration with a notch 26A in the blade assuring blade travel limit for proper blade shank locking in open position with locking release arm 18 engagement as hereinbefore described.

The auto opening blade spring assembly 29 is typical of a coil knife blade spring found in the industry which in this example is positioned in the handle portion around the opening for the hinge pin 14 and is engaged between the blade shank 11A and the frame of the handle portion so as to spring load the blade 11 when in closed locked position as is seen in FIG. 5 of the drawings and as such is well known and understood within the art of automatic spring urged knife blade configurations.

It will therefore be seen that in use from a closed folded position shown in FIG. 5 of the drawings, the blade 11 is held in place, under tension, within the handles 12 by the spring urged locking retainment activation arm 18 engaged against the blade shank retainment portion 27. Upon user, not shown, auto blade deployment is activated by sliding the locking release arm 18 back against the spring 22 as shown in broken lines in FIG. 5 of the drawings releasing the blade 11 for auto opening to a locked open position. As the shank tab 11A rotates, it will simultaneously lift the arm 18 which is accomplished due to the contoured depending portion 20A of the increased dimension of the slot 19 as seen in FIG. 4 of the drawings as the end surface of the arm 18 travels along the radial end of the shank 11A.

Once the blade 11 reaches full open position as illustrated best in FIGS. 1 and 6 of the drawings, the locking arm 18 slides back under spring 22 tension and locks the blade in open position. The arm's tapered blade shank engagement portion 23 is engaged as described on the shank's engagement portion 25. Correspondingly, to close the knife the user, not shown, will engage the locking arm's 18 upper end surface 17B sliding it back against the spring tension, releasing the blade 11 illustrated by directional force arrows FA thus releasing the blade shank 11A and the blade 11 allowing it to be pivoted down against the blade spring assembly 29 into the closed locked position in FIG. 5 of the drawings.

It will therefore be apparent from the above-described operational action that the auto opening folding knife 10 of the invention with the safety release locking arm assembly 17 achieves multiple actionable locking arm to blade and blade shank positional engagement in a selective controlled contact and locking engagement positions to define a unique auto opening safety lock arm assembly for a folding knife.

It will thus be seen that a new and useful auto opening folding arm locking knife has been illustrated and described and it will be apparent to those skilled in the art that various changes can be made therein without departing from the spirit of the invention. Therefore, I claim:

The invention claimed is:

1. An auto opening folding knife comprises, an elongated handle, an elongated knife blade having a sharp edge portion and an apertured shank portion, said elongated knife blade coupled within said elongated handle for pivoted movement from a first closed retained position to a second auto opened locked position, a blade engagement spring provides auto opening rotation force to the elongated knife blade upon release, an apertured spring urged locking and release arm within said elongated handle for engagement with said apertured shank portion is slidably disposed from said first closed retained position to said second auto blade release to open lock position in both longitudinal and vertical displacement, said apertured spring urged locking and release arm including a plurality of slots;

guide pins registerable in said apertured spring urged locking and release arm, one of said plurality of slots is a contoured depending portion retainment slot for vertical displacement of said apertured spring urged locking and release arm by said elongated shank portion, tapered upstanding end portion surfaces on said apertured spring urged locking and release arm, a blade shank engagement portion depending from said apertured spring urged locking and release arm defined by said contoured depending portion retainment slot, and an end engagement notch for registration with a stop pin on said elongated handle in the respective closed retained and open blade position.

2. The auto opening folding knife set forth in claim 1 wherein said handle includes handle portions, wherein the handle portions have an end handle spacer there between.

3. The auto opening folding knife set forth in claim 1 wherein wherein said plurality of slots further includes a longitudinal displacement apertured guide slot, such that the depending portion guide retainment slot and the longitudinal displacement apertured guide slot are in longitudinally aligned spaced relation to one another.

4. The auto opening folding knife set forth in claim 1 wherein said apertured shank portion has an arcuate end surface defining shank retainment portions when in locking arm engaged closed position and open position.

* * * * *